United States Patent [19]

Saxby et al.

[11] Patent Number: 5,400,745
[45] Date of Patent: Mar. 28, 1995

[54] SHELLFISH CULTURE AND HARVESTING SYSTEM

[75] Inventors: David J. Saxby, West Vancouver; Ronald Clark, Aldergrove; Laurent L. Leroux, Coquitlam; W. E. Lorne Clayton, Victoria, all of Canada

[73] Assignee: Gigas Growth Systems Inc., Vancouver, Canada

[21] Appl. No.: 161,392

[22] Filed: Dec. 6, 1993

[51] Int. Cl.$^6$ ............................................. A01K 61/00
[52] U.S. Cl. ................................... 119/239; 119/240; 119/241
[58] Field of Search ............... 119/234, 238, 239, 240, 119/241; 43/6.5

[56] References Cited

U.S. PATENT DOCUMENTS

| | | | |
|---|---|---|---|
| 4,170,197 | 10/1979 | Walker | 119/239 |
| 4,896,626 | 1/1990 | Holt et al. | 119/241 |
| 5,007,377 | 4/1991 | Muench, Jr. | 119/240 |

FOREIGN PATENT DOCUMENTS

| | | | |
|---|---|---|---|
| 2562387 | 10/1985 | France | 119/237 |
| 2645 | 8/1982 | WIPO | 43/6.5 |

Primary Examiner—Robert P. Swiatek
Attorney, Agent, or Firm—Elbie R. De Kock

[57] ABSTRACT

A method for the cultchless cultivation of mollusks comprises placing the mollusks in an elongate bag of mesh material, which is preferably about 100 feet long. The bag has a longitudinal slit therein for providing access to the bag. The bag is suspended under tension in an underwater off-bottom location whereby the slit is maintained in a closed position by the tension. The invention also includes apparatus for raising the bag into an elevated position above the water for husbandry and harvesting purposes. In one embodiment, the apparatus comprises a raft provided with a pair of spiked rollers thereon for moving the bag along the top of the raft.

29 Claims, 5 Drawing Sheets

SHELLFISH CULTURE AND HARVESTING SYSTEM

FIELD OF THE INVENTION

This invention relates to a method and apparatus for the culture and harvesting of molluscan shellfish, such as oysters, clams, mussels and scallops.

BACKGROUND OF THE INVENTION

In the commercial culture and harvesting of oysters, there has been a movement away from natural cultivation terrain and conditions to systems which create more favourable conditions. Thus, oysters have been cultivated in enclosures for protecting the oysters from predators but such enclosures must be cleaned at certain intervals depending on the prevailing conditions to provide for sufficient water circulation therethrough. During the initial stages of their growth, the apertures in the enclosures need to be sufficiently small but during the later stages of their growth, the oysters are more conveniently contained in containers having larger apertures and at the same time they require more space. Thus, it is necessary to have regular access to the containers for cleaning purposes, as well as for removal and transfer to larger apertured containers for effective cultivation.

Such operations are time consuming and labour intensive. It is, accordingly, an object of the present invention to provide a culture system and method which creates a larger throughput of product and is less labour intensive and, at the same time, allows easy access to the apertured culture containers.

It is also an object of the invention to provide an apertured culture container which allows for easy handling and an increased flow through of product, as well as apparatus for handling the container.

SUMMARY OF THE INVENTION

According to the invention, there is provided a method for the cultchless cultivation of marine bivalve mollusks, which comprises the steps of placing the mollusks in an elongate bag having an upper and a lower face of mesh material and bounded by a pair of substantially parallel longitudinal edges and a pair of transverse edges, said bag being closed along said longitudinal and transverse edges and being provided with a longitudinal slit in said upper face for providing access to said bag; and suspending said bag under tension in an underwater location, whereby said slit is maintained in a closed position by said tension.

Also according to the invention, there is provided a method of mollusk culture comprising the steps of cultivating mollusks in an elongate bag of mesh material which is suspended under tension in an underwater position, said bag having a longitudinally extending slit therein for the introduction of mollusks into or removal of mollusks from said bag and harvesting said mollusks by raising said bag into an elevated position above water and inverting said bag to discharge the mollusks through said slit.

Further according to the invention, there is provided a mollusk culture bag comprising an upper and a lower face of mesh material, said faces being bounded by a pair of substantially parallel longitudinal edges and a pair of transverse edges, the bag being closed along said longitudinal and transverse edges and being provided with a longitudinal slit in said upper face for providing access to said bag.

Also according to the invention, there is provided a mollusk culture system comprising at least one elongate mollusk culture bag of mesh material provided with a longitudinal slit therein, means for suspending said bag in a tensioned condition underwater and means for raising and supporting said bag in an elevated position above water.

Further according to the invention, there is provided a mollusk culture raft comprising a floatable platform having a pair of spaced rollers mounted thereon for supporting a mollusk culture bag between said rollers, means for driving the rollers and a power washer mounted on said raft for directing a spray of water under pressure onto a mesh culture bag being supported by said rollers.

Also according to the invention, there is provided an apparatus for supporting a meshed mollusk culture bag in an elevated position comprising a pair of spaced rollers provided with spikes on their circumferential surfaces for engaging with the meshed bag.

Further objects and advantages of the invention will become apparent from the description of a preferred embodiment of the invention below.

BRIEF DESCRIPTION OF THE DRAWINGS

The invention will now be described, by way of an example, with reference to the accompanying drawings, in which.

DETAILED DESCRIPTION OF PREFERRED EMBODIMENT

Figure 1:
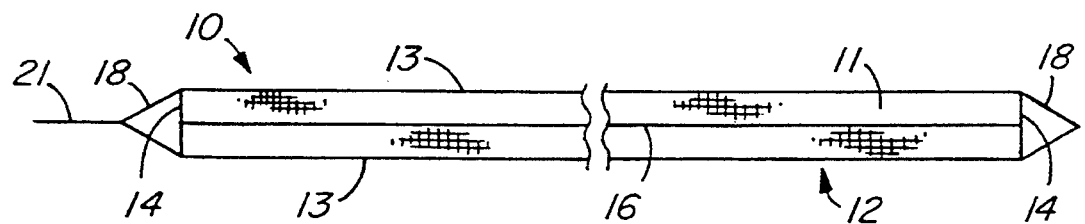
FIG. 1 is a fractional plan view of a mesh bag for oyster culture according to the invention.

With reference to FIG. 1, reference numeral 10 generally indicates an oyster culture bag which is of elongate shape and wherein its length dimension is substantially greater than its width dimension. The bag 10 is preferably about 100 feet long and about 30" wide. It is of a non-corrosive, flexible mesh material, such as a synthetic plastic, e.g., polyethylene. It has an upper face 11, a lower face 12, a pair of longitudinal edges 13 and a pair of transverse edges 14. The edges 13, 14 are closed. The bag 10 is provided with a longitudinal slit 16 in the upper face 11. Access to the inside of the bag 10 is obtained through the slit 16. The bag 10 is further provided with bridles 18 of rope spaced along the length of the bag 10 at approximately 6' intervals so that there are about sixteen bridles per 100' bag. A float 20 is attached to each bridle 18. In use, the floats 20 suspend the bag 10 in the water, as shown in FIG. 2.

Figure 2:
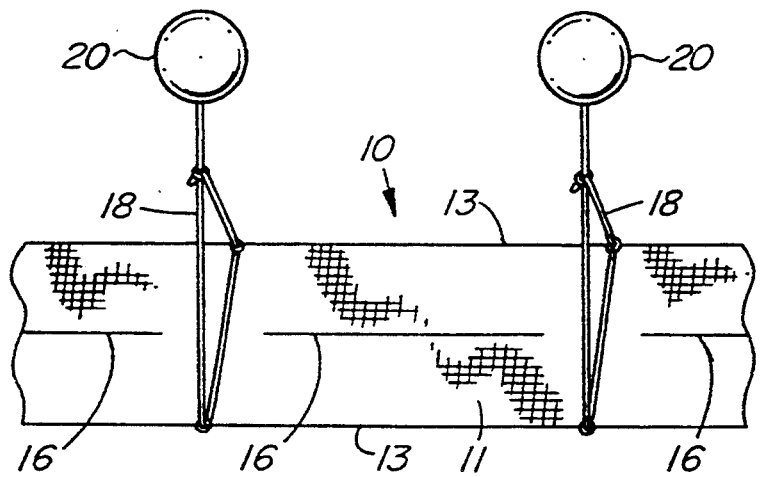
FIG. 2 is a fractional three-dimensional view of a part of the bag of FIG. 1 showing bridles with floats thereon.

Although the slit 16 is shown to be continuous in FIG. 1, it is preferably intermittent as shown in FIG. 2, extending only in the areas between the bridles 18 for distances of about 4' in the present example.

The bag 10 is also provided with a bridle 18 at each of its transverse ends 14. These bridles 18 are used to attach a plurality of the bags 10 together in series or to attach the one end of a bag 10 to a lead rope 21, as will be described below.

Figure 3:
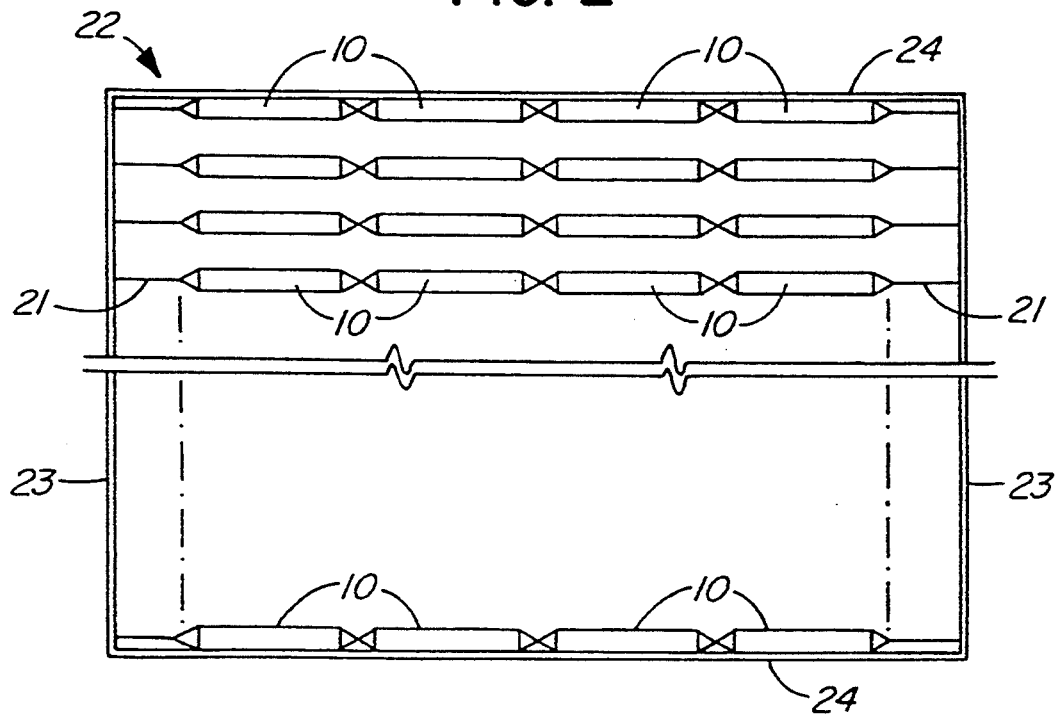
FIG. 3 is a plan view of a grid structure for supporting a plurality of the bags of FIG. 1 at an off-bottom position underwater.

In use, a plurality of the bags 10 are suspended in an off-bottom position in the water by means of a grid structure, generally indicated by reference numeral 22 in FIG. 3. The grid structure 22 can, of course, be of any convenient or desired shape or size. In the present example, it is 500' square. It comprises a pair of head ropes 23 forming two opposite sides and a second pair of ropes 24 forming the other two opposite sides of the grid structure 22. The ropes 23, 24 are, for example, 1½" diameter rope of a suitable polymer.

Figure 6:
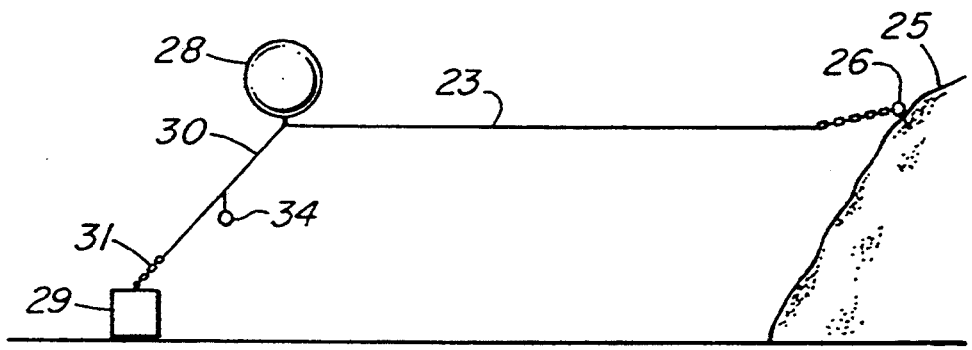
FIG. 6 is a side view illustrating the anchoring of a head line or rope of the grid structure of FIG. 3.
Figure 8:
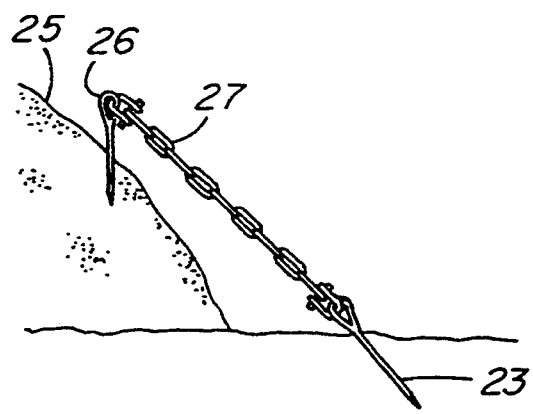
FIG. 8 is a fractional side view of part of the structure of FIG. 6, on a larger scale, showing the attachment of the headline to a rock pin on the shore.

The grid structure 22 is first constructed in the water prior to attachment of the bags 10. Each of the ropes 23, 24 is anchored as shown in FIG. 6. The one end of the rope 23 is anchored to a rock 25 on the shore by means of a 1" steel rock pin 26. The rope 23 is attached to the rock pin 26 through a ¾" chain 27, as shown in greater detail in FIG. 8.

Figure 7:
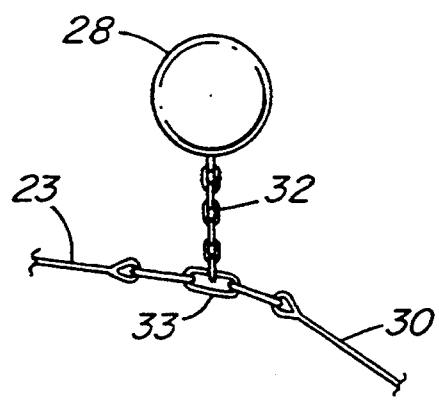
FIG. 7 is a fractional side view of part of the structure of FIG. 6, on a larger scale, showing the attachment of a buoy to the headline.
Figure 9:
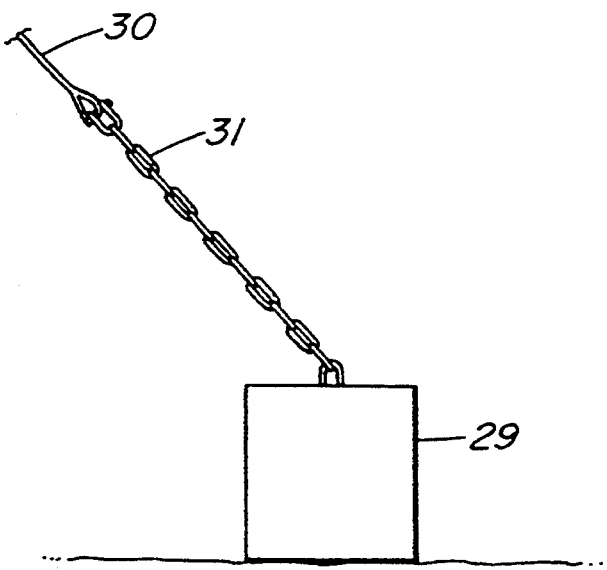
FIG. 9 is a fractional side view of part of the structure of FIG. 6, on a larger scale, showing the attachment of the buoy to an anchor on the water bottom.

The other end of the rope 23 is attached to a buoy 28 and attached to an anchor 29 on the water bottom by means of a 1½" rope 30. The rope 30 is connected to the anchor 29 through a ¾" chain 31, as shown in greater detail in FIG. 9. The anchor 29 has a mass of, for example, 2 metric tonnes. As shown in greater detail in FIG. 7, the buoy 28 is attached to the ropes 23 and 30 through the intermediary of chains 32 and 33. A catenary weight 34 can be provided on the rope 30, as shown in FIG. 6.

The arrangement is such that the ropes 23, 24 are sufficiently tensioned to provide structural integrity to the grid structure 22 for the installation of the bags 10. It will be appreciated that, depending on the circumstances, both ends of the rope 23 can be secured by means of a buoy 28 and anchor 29 or both ends can be secured to an on-shore rock 25 by means of a rock pin 26.

Once the grid structure 22 is in place, the bags 10 are installed as shown in FIG. 3. In the present example, four bags 10 are attached together in series through the bridles 18 at their ends, as shown in greater detail in FIGS. 4 and 5. At each such connection, a float 35 is provided. The floats 35 are in addition to the floats 20 spaced along the length of the bag 10 (FIG. 2) and not shown in FIGS. 3-5.

Figure 4:
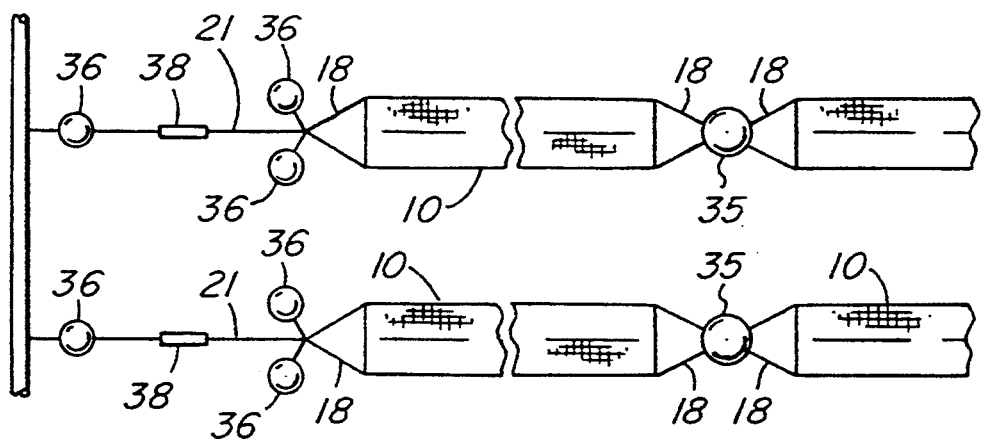
FIG. 4 is a fractional view of part of the grid structure of FIG. 3, on a larger scale, showing more details of the structure.
Figure 5:
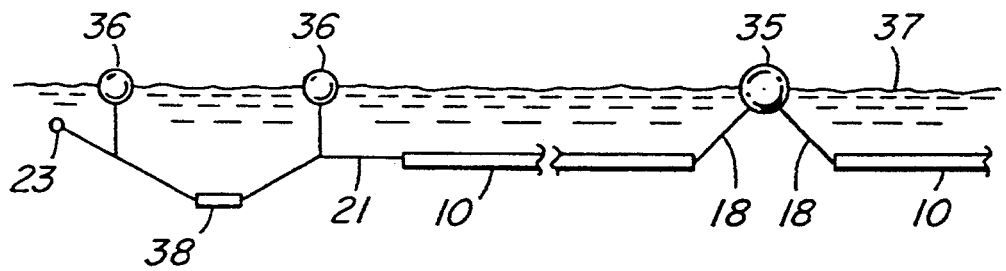
FIG. 5 is a side view of the structure shown in FIG. 4.

The bridles 18 on the outer ends 14 of the outermost bags 10 in each string of four bags 10 are attached to the lead ropes 21 which are approximately 50' in length. It is through these lead ropes 21 that each string of bags 10 is attached to the head ropes 23. Three floats 36 are provided on each head rope 21. As shown in FIG. 4, two of the floats 36 are provided on the bridle 18 and one is provided adjacent the head rope 23. The floats 20, 35, 36 all float on the water surface, which is indicated by reference numeral 37 in FIG. 5. The floats 20, 35, 36 have sufficient buoyancy to support the bags 10 and their contents. For example, the floats may be selected so that they have twice the buoyancy required to support the weight of the bags 10 and their contents.

The arrangement is such that the bags 10 are all supported in a horizontal position at a distance of some five or six feet below the water surface 37 and off the water bottom to counteract the activity of predators. To assist in tensioning each string of bags 10, a weight 38 of approximately 100 lbs. is provided on the lead rope 21. Thus, the bags 10 are under tension while in the suspended state. This results in the slit 16 in the upper face 11 of each bag 10 being kept closed to keep the contents of the bag 10 intact.

As shown in FIG. 3, in which only four strings of bags 10 are shown, the strings of bags 10 are installed between the head ropes 23 in spaced relationship. A spacing of about 20 feet between adjacent strings of bags 10 has been found to be convenient.

At the beginning of a growing cycle, a start with the oyster culture is made with a bag 10 of relatively small mesh, such as ⅛" or ¼". As the oysters grow larger, they are transferred to bags with progressively increasing mesh size, up to 1" or larger, and, at the same time, reduced in number per bag to provide more growing space. In the intervals between bag changes, the bags 10 need to be cleaned to remove debris which attach to the bag and clog up the mesh openings. In order to effect these operations, the bags 10 need periodically to be removed from the water.

Figure 10:
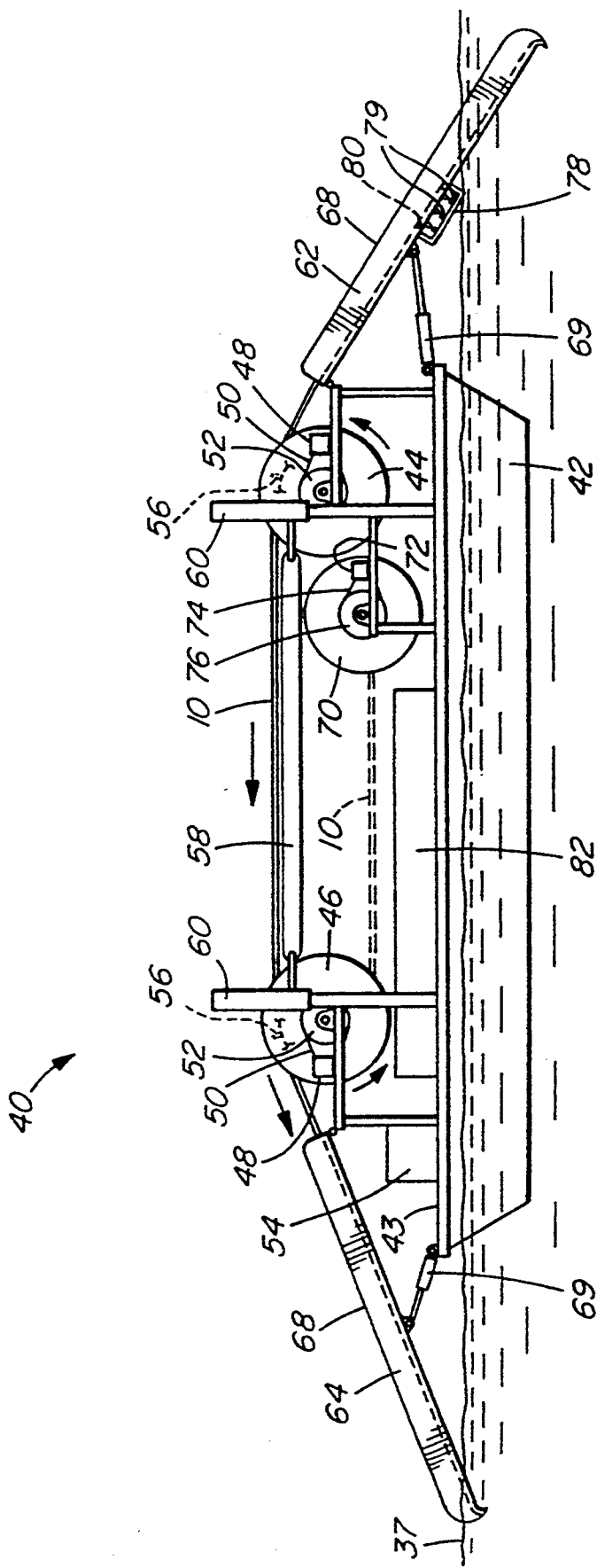
FIG. 10 is a side view of an apparatus according to the invention adapted for handling the bag of FIG. 1 for husbandry and harvesting purposes.
Figure 11:
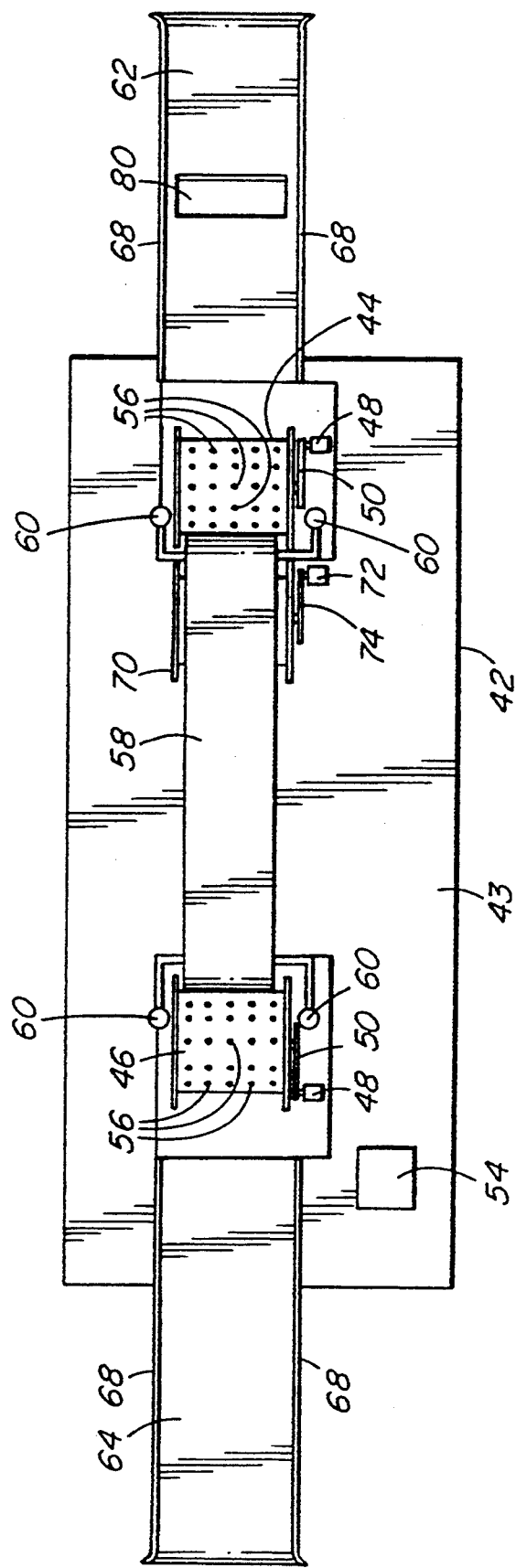
FIG. 11 is a plan view of the apparatus of FIG. 10.

In FIGS. 10 and 11, apparatus for handling the bags 10 is generally indicated by reference numeral 40.

The apparatus 40 comprises a raft 42 of a lightweight non-corrosive material, such as aluminum. The raft 42 has a platform 43 on which is located a pair of driven rollers 44, 46 in spaced-apart relationship. Each roller 44, 46 is driven by means of a reversible hydraulic motor 48 through a sprocket chain 50 and a gear wheel 52. A hydraulic pump 54 driven by any suitable power source, such as an internal combustion engine, is provided for powering the motors 48.

Each roller 44, 46 is provided with a plurality of spikes 56 on its cylindrical surface for engaging with the mesh openings on a bag 10.

A working surface or table top 58 is provided between the rollers 44, 46. The rollers 44, 46, the hydraulic motors 48 and the table top 58 are all conveniently supported on the raft 42 by means of support posts 60 at opposite ends of the raft 42. The arrangement is such that the table top 58 can be raised or lowered relative to the rollers 44, 46. This is achieved, for example, by the posts 60 comprising telescoping sections.

A ramp 62, 64 is hingedly connected at each of a pair of opposed ends of the raft 42. If it is assumed that the rollers 44, 46 are rotated anti-clockwise, then the ramp 62 will constitute the on-ramp and the ramp 64, the off-ramp. The ramps 62, 64 have upright side walls 68 for guiding a bag 10 therebetween. Each ramp 62, 64 can be provided with a buoyancy member, if desired, the buoyancy of which may be adjustable, e.g., by pumping water into or out of the buoyancy member. A pair of hydraulic cylinders 69 are also provided between each of the ramps 62, 64 and the platform 43, for raising or lowering the ramps 62, 64. In this way, the angle of each ramp 62, 64 relative to the platform 43 is adjustable. Thus, a bag 10 can be fed out of the water and onto the roller 42 and at an angle which is not too steep so as to damage the oysters in the bag 10. The same applies to feeding of the bag 10 from the roller 46 into the water.

A further roller 70, driven by a further hydraulic motor 72 through a sprocket chain 74 and gear wheel 76, is provided underneath the table top 58 for bag replacement, as will be described below.

In use of the apparatus 40 for bag cleaning purposes, a bag 10 will be removed from the grid 22 and manually pulled up along the ramp 62 and engaged with the roller 44. Alternatively, a rope may be attached to the leading end of the bag 10 and attached to the roller 70 for pulling the bag up the ramp 62. As the rollers 44, 46 are driven in an anti-clockwise direction, the bag 10, with the slit 16 uppermost, is moved along the table top 58 to the roller 46 and engaged therewith. As the bag 10 leaves the roller 46, it is moved down the ramp 64 back into the water. A power washer 78, comprising a pipe frame with spray nozzles 79 thereon, and which ejects jets of water under pressure, is located on the raft 42 above and below the on-ramp 62. A window 80 is provided in the ramp 62. The washer 78 sprays the bag 10 through the window 80 with water under pressure as the bag 10 is moved along by the rollers 44, 46 in order to clean away any debris and unwanted matter, thus cleaning the bag 10 and the oysters in the bag and clearing the apertures in the bag 10.

At times when the oysters are to be removed from a bag 10 in order to be transferred to another bag or when they are harvested, the bag 10 is guided around the roller 46 and fed onto the roller 70. During this operation, as shown in broken lines in FIG. 10, the bag 10 passes along underneath the table top 58 and is inverted so that the slit 16 is now facing downwards. In this way, the oysters are automatically ejected from the bag 10. A water bath 82 is placed below the table top 58 for catching the oysters ejected from the bag 10.

The empty bag 10 is rolled up onto the roller 70, which can then be removed and replaced with another roller 70 with another bag 10, e.g., a bag with larger apertures thereon. The new bag 10 is then fed around the roller 46 and onto the roller 44. The oysters ejected from the previous bag can then be inserted into the new bag 10 during its travel along the table top 58 with the slit 16 uppermost by workers stationed along the table top 58. From the roller 44, the filled bag 10 is returned to the water down the ramp 62. During the bag-filling operation, the rollers 44, 46 will be driven in an opposite direction, i.e., clockwise in the present example.

When the oysters are harvested they are transferred from the water bath 82 into a blast freezer (not shown) where they are cryogenically frozen so that the integrity of their cell structure is preserved. For this purpose, a transverse conveyor (not shown) can conveniently be provided for transporting the oysters from the water bath 82 to the blast freezer. Freezing can be effected by means of liquid carbon dioxide or other suitable freezing device which can provide low temperatures.

In a further embodiment of the invention, rails (not shown) can be provided above or alongside the rollers 44, 46 for supporting the floats 20 which are attached to the bag 10, while the bag 10 passes between the rollers 44, 46 for husbandry purposes, e.g., during routine inspection or washing of the bag 10. When the oysters are to be transferred to another bag or harvested, the floats 20 may simply be severed from the bag 10 by cutting the bridle ropes prior to the bag 10 being rolled up onto the roller 70.

While the apparatus 40 has been described as comprising a raft, it will be appreciated that it may also be land based or provided as an attachment to a larger vessel, such as a barge.

Since the oysters are permanently suspended in an off-bottom location beneath the water surface by means of the grid 22, and not subject to tidal fluctuation, the shells are softer. Once frozen, the one valve can be removed and the oysters can be further treated prior to packing to meet the requirements of a particular market.

While bags 10 with a length of approximately 100' have been described in the present example, it will be appreciated that the bags 10 may have any convenient or desired length. For example, they may be as short as only 10' or up to 500' or more in length.

While in the example given above, reference has only been made to the cultivation of oysters, it will be appreciated that the system according to the invention can also be used for the cultivation of other bivalve mollusks, such as clams and scallops.

While only preferred embodiments of the invention have been described herein in detail, the invention is not limited thereby and modifications can be made within the scope of the attached claims.

What is claimed is:

1. A method for the cultchless cultivation of marine bivalve mollusks, which comprises the steps of:
   placing the mollusks in an elongate bag having an upper and a lower face of mesh material and bounded by a pair of substantially parallel longitudinal edges and a pair of transverse edges, said bag being closed along said longitudinal and transverse edges and being provided with a longitudinal slit in said upper face for providing access to said bag; and
   suspending said bag under tension in an underwater location, whereby said slit is maintained in a closed position by said tension.

2. The method according to claim 1, wherein the bag is suspended in an off-bottom location underwater.

3. The method according to claim 2, wherein said bag is approximately 100 feet to 500 feet long.

4. The method according to claim 3, further comprising the steps of removing the bag from said suspended state and raising the bag into an elevated position above the water to provide access to the mollusks in the bag.

5. The method according to claim 4, further comprising the step of spraying water under pressure onto said bag in said elevated position thereby to clean the bag.

6. The method according to claim 5, wherein the bag in said elevated position is supported by a pair of spaced, spiked rollers with the upper face of the bag and said slit facing upwards.

7. The method according to claim 6, further comprising the step of discharging mollusks from said bag by turning the bag through 180° around one of said rollers to invert the bag for discharging the mollusks through said slit.

8. The method according to claim 7, further comprising the step of rolling said bag onto a third roller after the discharge of the mollusks therefrom.

9. The method according to claim 8, wherein said mollusks comprise oysters.

10. A method of mollusk culture comprising the steps of cultivating mollusks in an elongate bag of mesh material which is suspended under tension in an underwater position, said bag having a longitudinally extending slit therein for the introduction of mollusks into or removal of mollusks from said bag and harvesting said mollusks by raising said bag into an elevated position above water and inverting said bag to discharge the mollusks through said slit.

11. The method according to claim 10, wherein said mollusks are subjected to cryogenic cooling after said harvesting.

12. The method according to claim 10, wherein said mollusks comprise oysters.

13. A mollusk culture bag comprising an upper and a lower face of mesh material, said faces being bounded by a pair of substantially parallel longitudinal edges and a pair of transverse edges, the bag being closed along said longitudinal and transverse edges and being provided with a Series of longitudinal slits in said upper face, the slits being spaced apart from each other in the longitudinal direction of the bag.

14. The mollusk culture bag according to claim 13, wherein said bag is about 100 feet long.

15. The mollusk culture bag according to claim 14, wherein the mesh material has a mesh size in the range of from $\frac{1}{8}$" to 1".

16. The mollusk culture bag according to claim 14, wherein the mesh material has a mesh size of greater than 1".

17. The mollusk culture bag according to claim 13, wherein said slits are located substantially equidistant between said longitudinal edges.

18. The mollusk culture bag according to claim 13, provided with bridles spaced along the length thereof for attaching floats to said bag.

19. The mollusk culture bag according to claim 18, wherein said longitudinal slits extend in the spaces between adjacent pairs of said bridles.

20. A mollusk culture system comprising at least one elongate mollusk culture bag of mesh material provided with an longitudinal slit therein, means for suspending said at least One bag in a tensioned condition underwater and means for raising and supporting said at least one bag in an elevated position above water.

21. The mollusk culture system according to claim 20, wherein said at least one bag is about 100 feet long.

22. The mollusk culture system according to claim 20, wherein said raising and supporting means comprises a pair of spaced rollers for supporting said at least one bag between the rollers in said elevated position.

23. The culture system according to claim 22, wherein said rollers are provided with spikes thereon for engaging with the at least one culture bag.

24. The culture system according to claim 23, further comprising a third roller below said pair of spaced rollers for rolling a culture bag onto said third roller.

25. The culture system according to claim 24, wherein said pair of rollers are located on a floatable platform.

26. A mollusk culture raft comprising a floatable platform having a pair of spaced rollers mounted thereon for supporting a mollusk culture bag between said rollers, a third roller below said pair of spaced rollers for rolling a culture bag extending around one of said pair of spaced rollers onto said third roller and means for driving the rollers.

27. The mollusk culture raft according to claim 26 wherein said rollers are provided with spikes on their circumferential surfaces for engagement with a mesh culture bag.

28. The mollusk culture raft according to claim 26, further comprising a power washer mounted on said raft for directing a spray of water under pressure onto a mesh culture bag being supported by said pair of spaced rollers.

29. Apparatus for supporting a meshed mollusk culture bag in an elevated position comprising a pair of spaced rollers and a third roller below said pair of spaced rollers for rolling a culture bag extending around one of said pair of spaced rollers onto said third roller, the rollers being provided with spikes on their circumferential surfaces for engaging with the meshed bag.

* * * * *